United States Patent
Diamant et al.

(10) Patent No.: US 11,467,973 B1
(45) Date of Patent: Oct. 11, 2022

(54) FINE-GRAINED ACCESS MEMORY CONTROLLER

(71) Applicant: Amazon Technologies, Inc., Seattle, WA (US)

(72) Inventors: Ron Diamant, Albany, CA (US); Sundeep Amirineni, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 16/146,332

(22) Filed: Sep. 28, 2018

(51) Int. Cl.
| | |
|---|---|
| *G06F 12/00* | (2006.01) |
| *G06F 12/10* | (2016.01) |
| G06F 12/1018 | (2016.01) |
| G06F 12/1027 | (2016.01) |
| G06F 12/1081 | (2016.01) |
| G06F 12/1045 | (2016.01) |
| G06F 12/1009 | (2016.01) |
| G06F 12/1036 | (2016.01) |
| G06F 12/1072 | (2016.01) |

(52) U.S. Cl.
CPC .......... *G06F 12/10* (2013.01); *G06F 12/1009* (2013.01); *G06F 12/1018* (2013.01); *G06F 12/1027* (2013.01); *G06F 12/1036* (2013.01); *G06F 12/1045* (2013.01); *G06F 12/1054* (2013.01); *G06F 12/1063* (2013.01); *G06F 12/1072* (2013.01); *G06F 12/1081* (2013.01); *G06F 2212/1016* (2013.01); *G06F 2212/65* (2013.01); *G06F 2212/651* (2013.01); *G06F 2212/652* (2013.01); *G06F 2212/653* (2013.01); *G06F 2212/654* (2013.01); *G06F 2212/655* (2013.01); *G06F 2212/656* (2013.01); *G06F 2212/657* (2013.01); *G06F 2212/68* (2013.01); *G06F 2212/681* (2013.01); *G06F 2212/682* (2013.01); *G06F 2212/683* (2013.01); *G06F 2212/684* (2013.01); *G06F 2212/7201* (2013.01)

(58) Field of Classification Search
CPC ............ G06F 12/10; G06F 2212/1016; G06F 12/1009; G06F 12/1018; G06F 12/1027; G06F 12/1036; G06F 12/1045; G06F 12/1054; G06F 12/1063; G06F 12/1072; G06F 12/1081; G06F 2212/65; G06F 2212/651; G06F 2212/652; G06F 2212/653; G06F 2212/654; G06F 2212/655; G06F 2212/656; G06F 2212/657; G06F 2212/68; G06F 2212/681; G06F 2212/682; G06F 2212/683; G06F 2212/684; G06F 2212/7201
See application file for complete search history.

(56) References Cited

U.S. PATENT DOCUMENTS

| | | | | |
|---|---|---|---|---|
| 4,959,776 A | * | 9/1990 | Deerfield ................ | G06F 9/345 365/230.03 |
| 6,647,484 B1 | * | 11/2003 | Jiang ....................... | G06F 9/345 711/110 |

(Continued)

*Primary Examiner* — Arvind Talukdar
(74) *Attorney, Agent, or Firm* — Kilpatrick Townsend & Stockton LLP

(57) ABSTRACT

Systems and methods are provided to perform fine-grained memory accesses using a memory controller. The memory controller can access elements stored in memory across multiple dimensions of a matrix. The memory controller can perform accesses to non-contiguous memory locations by skipping zero or more elements across any dimension of the matrix.

16 Claims, 10 Drawing Sheets

(56) References Cited

U.S. PATENT DOCUMENTS

| | | | | |
|---|---|---|---|---|
| 2008/0052460 | A1* | 2/2008 | Drori | G06F 13/28 |
| | | | | 711/114 |
| 2016/0358069 | A1* | 12/2016 | Brothers | G06F 7/764 |
| 2018/0032859 | A1* | 2/2018 | Park | G06N 3/04 |
| 2018/0225116 | A1* | 8/2018 | Henry | G06F 9/30076 |
| 2018/0232629 | A1* | 8/2018 | Du | G06N 3/04 |
| 2018/0253635 | A1* | 9/2018 | Park | G06F 7/535 |
| 2018/0315153 | A1* | 11/2018 | Park | G06K 9/00885 |
| 2018/0315154 | A1* | 11/2018 | Park | G06K 9/00973 |
| 2019/0114538 | A1* | 4/2019 | Ng | G06N 3/063 |
| 2019/0188899 | A1* | 6/2019 | Moloney | G06F 9/30029 |
| 2019/0236442 | A1* | 8/2019 | Chen | G06F 9/30014 |
| 2020/0074289 | A1* | 3/2020 | Yu | G06N 3/063 |
| 2020/0090023 | A1* | 3/2020 | Joseph | G06V 10/82 |

* cited by examiner

US 11,467,973 B1

FINE-GRAINED ACCESS MEMORY CONTROLLER

BACKGROUND

In computer systems, memory controllers are used to manage write and read accesses to memory. Generally, the memory controllers are designed to access consecutive memory locations or addresses in the memory. For example, information may be stored in the consecutive memory locations for performance optimization or to facilitate pre-fetching. In most implementations, a start address and a length parameter may be provided to the memory controller to perform the access.

BRIEF DESCRIPTION OF THE DRAWINGS

Various embodiments in accordance with the present disclosure will be described with reference to the drawings, in which.

DETAILED DESCRIPTION

Figure 1A:
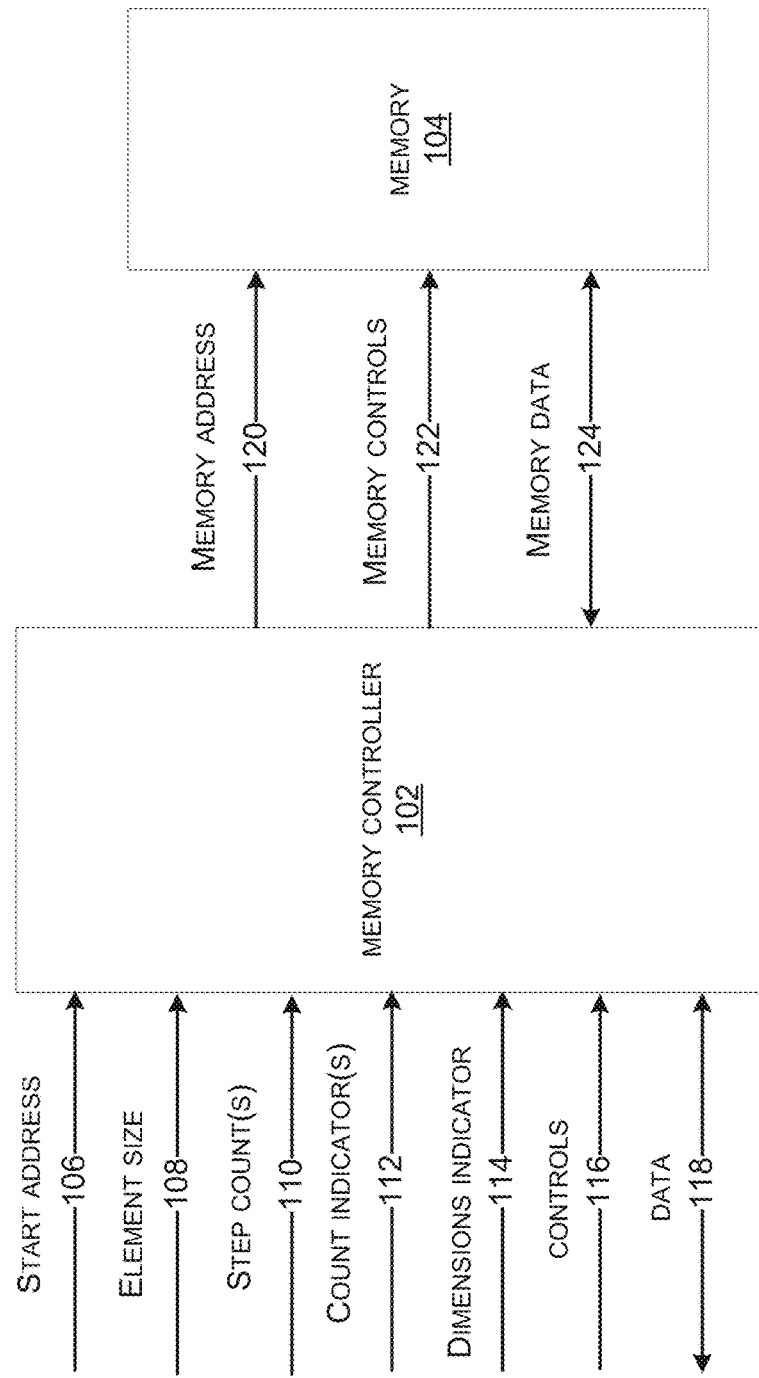
FIG. 1A illustrates an apparatus comprising a memory controller to perform fine-grained memory accesses, in one embodiment of the disclosed technologies.

In certain computer systems, the information may not be stored in consecutive memory locations. For example, matrices may be stored as rows and columns, instead of packing the rows sequentially. Such matrices may be used in neural network computations. Neural network computations are generally performed on data sets which are arranged as sets of matrices. A matrix can be a multi-dimensional array. For example, a two-dimensional array can be arranged into rows (e.g., x-dimension) and columns (e.g., y-dimension). These sets of matrices may include data elements for various data processing applications. For example, the data elements may correspond to an input image, an audio clip, a video clip, a text portion, or any data suitable for data processing applications such as image recognition, text-based data processing (e.g., processing of search queries), audio or video data processing, etc. The set of matrices may be stored in a memory and may be fed to a neural network processor for performing arithmetic computations.

Generally, storing the matrices in the memory as rows and columns may be easier to manage compared to packing the matrices sequentially in the memory. In certain implementations, direct memory accesses (DMAs) used for the data transfer between the memory and the neural network processor may be easier to manage when accesses are aligned to a specific size (e.g., 8 bytes, 32 bytes, 64 bytes, etc.). For example, the accesses may be aligned to a width of the memory data bus or memory banks. As an example, a 7×7 matrix (e.g., 7 rows and 7 columns) may be stored at an address 0. Assuming each element of the matrix is 1 byte and each row is aligned to 8 bytes, a second row of the matrix may be stored at an address 8 instead of the address 7. In this example, memory locations at addresses 7, 15, 23, 31, 39, and 47 may include garbage or irrelevant data.

In most implementations, a start address and a length parameter may be provided to access the memory. The start address may indicate a first address for the memory where the information is stored. In some instances, the memory may be implemented as a data buffer for temporary storage of data. For example, the data buffer may be mapped to a region in a main memory. The length parameter may indicate a size of data transfer in units of elements or bytes. Generally, the matrices are stored as rows and columns in the memory to make reading from the memory more manageable. However, to access different matrices that are not packed in the memory in consecutive locations, multiple small accesses may need to be performed since memory aligned accesses may result in accessing garbage data. Furthermore, in systems like neural networks, where computations are performed on a large amount of data, a significant number of memory accesses may be required. These multiple non-consecutive memory accesses may not be efficient and may degrade the system performance. Scatter-gather techniques can be used for accessing multiple non-contiguous blocks of memory data. However, scatter-gather techniques may be generally limited to performing accesses on the blocks of data and may not work for fine-grained accesses within a matrix stored within a data buffer, as described below.

Some embodiments of the disclosed technologies can provide methods and systems to allow fine-grained accesses to elements stored in the memory using a memory controller. The fine-grained accesses may include access to non-contiguous locations within a portion of the memory. The memory controller may be configured to perform fine-grained memory accesses using a start address, a count indicator, and an address offset. The start address may correspond to an address for the memory. The count indicator may correspond to a number of elements to be accessed. The address offset may correspond to an address increment between accessing each of the elements to be accessed. The address offset may be calculated by multiplying an element size with a step count. The element size may correspond to a size of each element, e.g., 1 byte, 4 bytes, 8 bytes, etc. The step count may indicate zero or more elements that can be skipped or jumped to access a next element to be accessed. In one embodiment, the address offset may be generated externally using the step count and the element size, and provided to the memory controller to determine a respective address to access each element to be accessed. In another embodiment, the memory controller may receive the step count and the element size, and generate the address offset.

The memory controller may be configured to generate the respective address to access each of the elements in the number of elements based on the start address and the address offset. This may allow jumping locations in the memory to access elements that are stored in non-contiguous memory locations by skipping zero or more elements based on the step count and the element size. In some implementations, a step count equal to "p" may correspond to skipping "p−1" elements for a given dimension. For example, a step count equal to 1 may correspond to skipping zero elements and can be used to access contiguous memory locations. A step count of more than one may be used to access non-contiguous memory locations.

In some embodiments, the elements to be accessed may correspond to an array having one or more dimensions. A two dimensional array may correspond to a matrix with rows and columns. For example, the data elements may be stored across a first dimension (e.g., x-dimension) and a second dimension (e.g., y-dimension) of the two-dimensional array. A three-dimensional array may include a third dimension (e.g., z-dimension) which may be used to store a set of matrices. A four-dimensional array may include a fourth dimension (e.g., w-dimension) which may be used to store multiple sets or a matrix of matrices. Certain embodiments of the disclosed technologies may be used to perform fine-grained accesses to non-contiguous memory locations using a respective address offset and a respective count indicator for each dimension by jumping locations across multiple dimensions of the array.

Some embodiments can be used in neural networks to perform fine-grained memory accesses using the memory controller to read sets of matrices from the memory. The memory access information used by the memory controller may be provided as part of an instruction to a neural network processor. The neural network processor can decode the instruction, extract different parameters, and provide the parameters to the memory controller to perform memory accesses using the parameters. The fine-grained accesses may be beneficial for the data processing applications which may work on a tile or a portion of the matrix. For example, certain neural network computations may include performing pooling operations on a tile of the matrix. The pooling operations may include mean or maximum pooling to reduce the spatial dimensions. Certain embodiments of the disclosed technologies can use the memory controller to read a set of elements corresponding to a tile of the matrix using the appropriate address offset and the count indicator. The pooling engine can identify an element with a maximum value from the set of elements read from the memory, which can help accelerate the pooling operations on a large number of data sets. Certain embodiments can use the respective address offsets and the count indicators for the multiple dimensions to support reading multiple tiles of the matrix. Some embodiments may utilize the memory controller to read the input data sets from the memory to perform matrix multiplications with a filter using a stride.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1A illustrates an apparatus comprising a memory controller to perform fine-grained memory accesses in a first embodiment of the disclosed technologies. As shown in FIG. 1A, an apparatus 100 may include a memory controller 102 coupled to a memory 104. The apparatus 100 may be part of a computer system. In some embodiments, the computer system may be used for data processing applications, e.g., neural networks, pattern recognition, search enquiries, etc.

The memory controller 102 may be configured to receive information to perform fine-grained memory accesses. In some embodiments, the memory controller 102 may receive a start address 106, controls 116, and a plurality of parameters for accessing the memory 104. Accessing the memory 104 may include writing to the memory 104 or reading from the memory 104. The memory controller 102 may be further configured to receive data 118 for writing to the memory 104 or provide the data 118 read from the memory 104 based on the start address 106, the controls 116, and the plurality of parameters. The data 118 may correspond to an array with one or more dimensions. In some instances, the array may comprise input data elements for neural network computations, pattern recognition, search enquiries, or other data processing applications. The plurality of parameters may include an element size 108, one or more step counts 110, one or more count indicators 112, and a dimensions indicator 114. The dimensions indicator 114 may include a positive integer indicating a number of dimensions, e.g., 1, 2, 3, 4, or more. The start address 106 may correspond to an address for the memory 104. The controls 116 may include write or read indicators, enables, or other relevant signals.

The step counts 110 may include one or more step counts for one or more dimensions of the array. For example, the step count(s) 110 may include a first step count, a second step count, and an nth step count for N dimensions of the array. N may be provided using the dimensions indicator 114. Each step count may correspond to a respective number of elements to be skipped between accessing each of the elements to be accessed for a given dimension. For example, the first step count may correspond to a first number of elements to be skipped for the first dimension, the second step count may correspond to a second number of elements to be skipped for the second dimension, and the nth step count may correspond to an nth number of elements to be skipped for the nth dimension. The number of elements to be skipped may be 0, 1, 2, or more. For example, to access contiguous elements stored in the memory, the number of elements skipped may be 0. The element size 108 may correspond to a size of each element to be accessed. For example, the element size 108 may be 1 byte, 4 bytes, 8 bytes, 16 bytes, etc.

The count indicator(s) 112 may include one or more counts for one or more dimensions of the array. In some embodiments, a first count indicator may represent a number of elements corresponding to a number of columns to be accessed for the first dimension, a second count indicator may represent a number of rows to be accessed for the second dimension, a third count indicator may represent a number of matrices to be accessed for the third dimension, and a fourth count indicator may represent a number of sets of matrices to be accessed for the fourth dimension. Note that even though some embodiments have been described using the matrices as an example, it will be understood that the count indicator(s) 112 can be used to represent a different arrangement of data without deviating from the scope of the disclosed technologies.

The memory controller 102 may be further configured to provide a memory address 120 and memory controls 122 to perform a read or a write access to the memory 104 based on the start address 106, the controls 116, the count indicators 112, and the dimensions indicator 114. The memory controls 122 may include a read, write, bank activate, enables, strobes, or other suitable signals. The memory controller 102 may also be configured to provide memory data 124 for the write access or receive the memory data 124 from the memory 104 for the read access. The memory controller 102 may be configured to provide the memory address 120 for each access to the memory 104 by generating a respective address for each element to be accessed based on the start address 106 and a respective address offset for a given dimension. The memory controller 102 may be configured to access the respective address offset to generate the respective address for each element to be accessed for the given dimension. The respective address offset may correspond to a respective address increment between accessing each of the elements to be accessed for the given dimension. The respective address offset for each dimension of the array may be calculated by multiplying the element size 108 with a respective step count 110. Adding the respective address offset may correspond to skipping zero or more elements for the respective dimension. Thus, based on the value of the respective address offset and the respective count indicator, fine-grained access to non-contiguous memory locations can be performed for any given direction.

The memory 104 may include any suitable memory, e.g., static random access memory (SRAM), dynamic random access memory (DRAM), synchronous DRAM (SDRAM), double data rate DRAM (DDR DRAM), etc. The memory 104 may be an independent memory device or part of another memory device. In some embodiments, the memory 104 may be mapped to a memory region in the main memory (not shown). For example, the memory 104 may be used as a buffer memory for temporary storage of data. The memory 104 may be configured to receive the memory address 120 and the memory controls 122 from the memory controller 102 to perform an access to the memory 104. The memory 104 may be further configured to receive the memory data 124 for a write access or provide the memory data 124 for a read access.

Figure 1B:
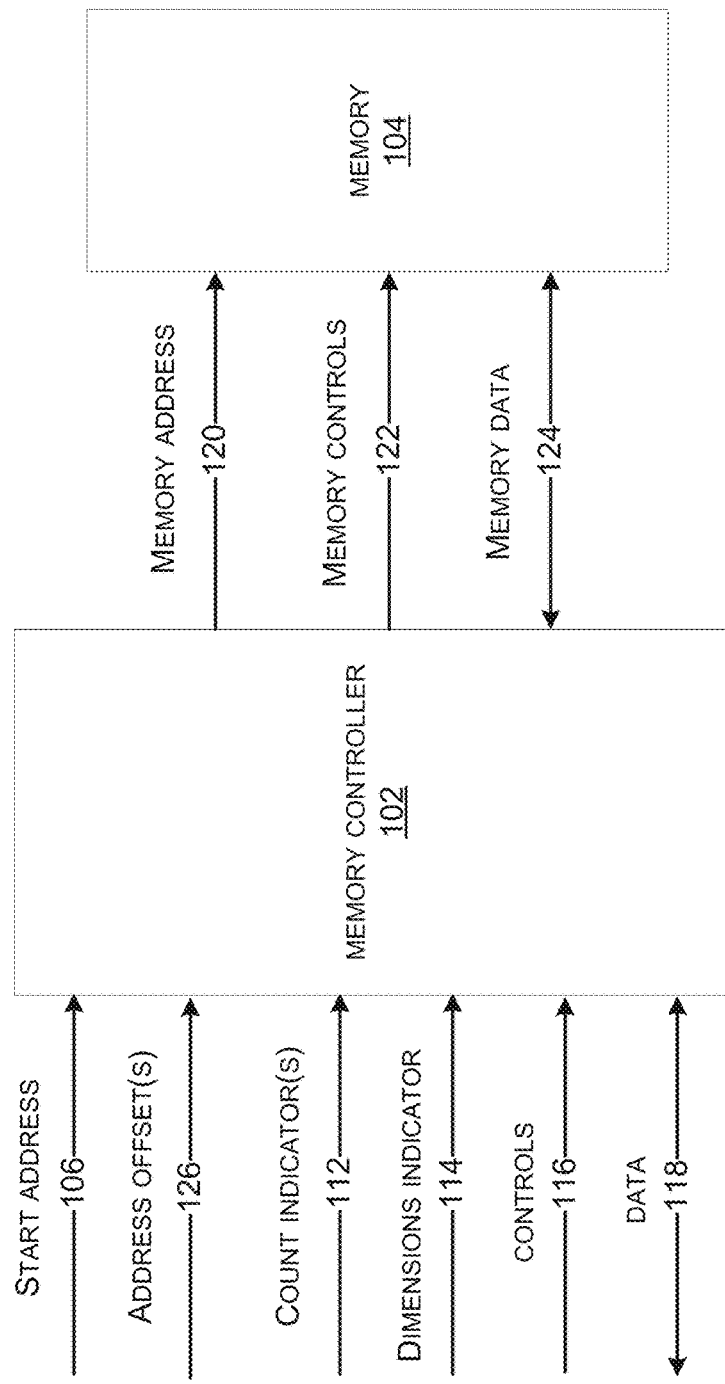
FIG. 1B illustrates an apparatus comprising a memory controller to perform fine-grained memory accesses, in another embodiment of the disclosed technologies.

FIG. 1B illustrates the apparatus 100 comprising the memory controller 102 to perform fine-grained memory accesses in a second embodiment of the disclosed technologies. As shown in FIG. 1B, the memory controller 102 may receive address offset(s) 126 in place of the element size 108 and the step count(s) 110. The address offset(s) 126 may be generated externally using the element size 108 and the step count(s) 110.

The address offset(s) 126 may include one or more address offsets for one or more dimensions of the array. For example, the address offset(s) 126 may include a first address offset, a second address offset, and an nth address offset for N dimensions of the array. N may be provided using the dimensions indicator 114. Each address offset may correspond to a respective address increment between accessing each of the elements to be accessed for a given dimension. For example, the first address offset may correspond to a first address increment between accessing each of the elements to be accessed for a first dimension, the second address offset may correspond to a second address increment between accessing each of the elements to be accessed for a second dimension, and the nth address offset may correspond to an nth address increment between accessing each of the elements to be accessed for the nth dimension.

Each address offset may correspond to skipping zero or more elements for the respective dimension for a given element size. For example, for contiguous elements, the address offset may correspond to an address increment which may be equal to the size of the element. If each element is one byte in size, an address increment (e.g., address offset) between accessing each consecutive element may be one byte. However, an address offset of 2 bytes may correspond to skipping every other element. Similarly, adding the second address offset may correspond to skipping zero or more rows for the second dimension. The memory 104 may be configured to store the elements across one or more dimensions of an array as shown using various examples with reference to FIG. 2A and FIG. 2B.

Figure 2B:
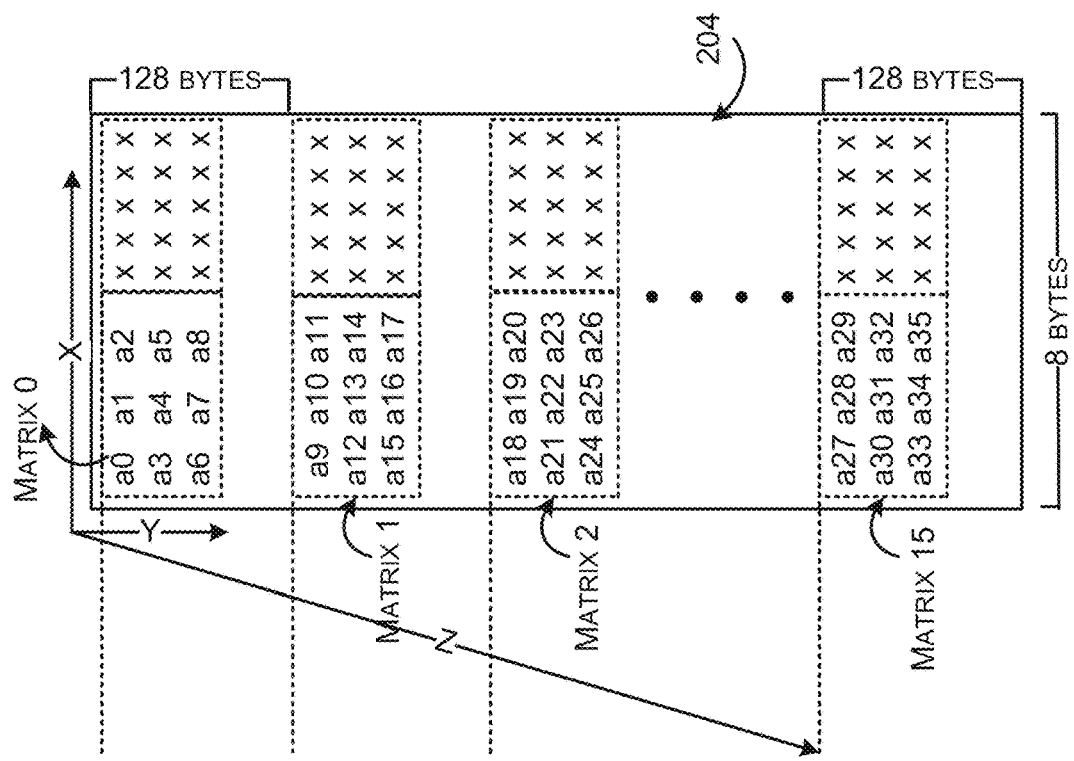
FIG. 2B illustrates a set of matrices stored in the memory, which can be accessed using the memory controller in certain embodiments of the disclosed technologies.
Figure 2A:
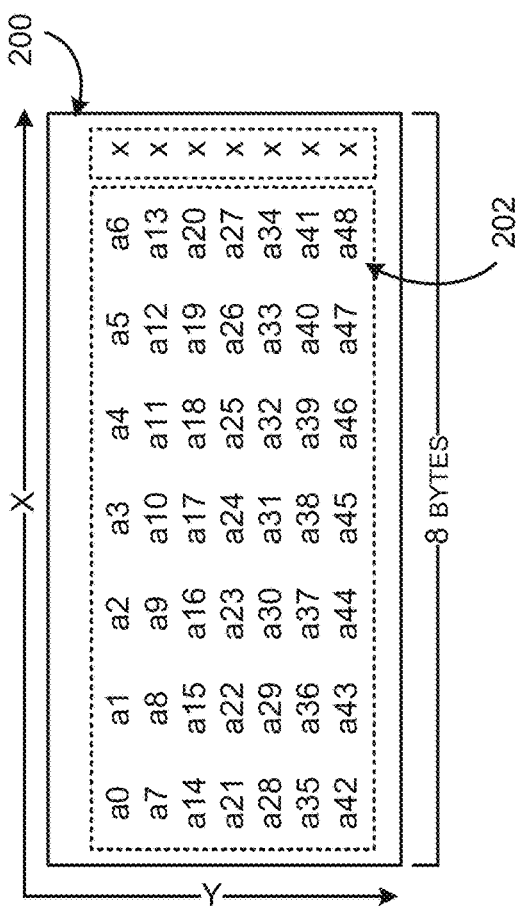
FIG. 2A illustrates an example matrix stored in the memory, which can be accessed using the memory controller according to certain embodiments of the disclosed technologies.

FIG. 2A illustrates an example matrix stored in the memory, which can be accessed using the memory controller according to certain embodiments of the disclosed technologies.

A matrix 202 may be stored in a memory region 200. The memory region 200 may be part of the memory 104 in FIG. 1. The matrix 202 may be a two-dimensional array (e.g., N=2) with rows and columns. The matrix 202 may include 7 elements in each row and 7 elements in each column. As an example, each element of the matrix 202 may be one byte in size, e.g., the element size 108 is 1 byte. In certain implementations, the matrix 202 may be stored in the memory region 200 such that each row of the matrix 202 is aligned to 8 bytes. As shown in the figure, the last memory location in each row may be unused (denoted as x).

Table 1 below shows the information used by the memory controller 102 to access the matrix 202 stored in the memory region 200.

| Start address | 0 |
|---|---|
| dimensions indicator | 2 |
| first count indicator | 7 |
| first address offset | 1 byte |
| second count indicator | 7 |
| second address offset | 8 bytes |

The information may include the start address 106, the address offsets 126, the count indicators 112, the dimensions indicator 114, and the controls 116. As an example, the start address 106 may be 0, which may correspond to a start address of the matrix 202. The dimensions indicator 114 may indicate a value of 2 for N, e.g., two dimensions. The count indicators 112 may include a first count indicator for the x-dimension and a second count indicator for the y-dimension. For example, the first count indicator may be equal to 7 indicating 7 elements corresponding to 7 columns in the x-dimension, and the second count indicator may be equal to 7 indicating 7 rows in the y-dimension.

The address offsets 126 may be generated using the element size 108 and the step counts 110. The first step count for the x-dimension may be "1" corresponding to zero elements to be skipped for the x-dimension between accessing each element to be accessed in the x-dimension. The second step count for the y-dimension may be "8" corresponding to 7 elements to be skipped for the y-dimension between accessing each element to be accessed in the y-dimension. The address offsets 126 may include a first address offset for the x-dimension and a second address offset for the y-dimension. The first address offset may be generated by multiplying the element size 108 with the first step count, and the second address offset may be generated by multiplying the element size 108 with the second step count. The first address offset value of 1 byte may correspond to an address increment of 1 byte between accessing each of the elements to be accessed for the x-dimension. For example, as shown in FIG. 2A, the first address offset value of 1 byte may correspond to an address increment of 1 byte between accessing elements a0 and a1, a1 and a2, a2 and a3, a3 and a4, a4 and a5, and a5 and a6 for the first row. In other words, the element a0 may be accessed using the start address 106. In one embodiment, the respective address may be generated by iteratively adding the first address offset to the start address for remaining elements (e.g., a1, a2, a3, a4, a5, and a6) to be accessed for the x-dimension. For example, the first address offset value of 1 byte may be added to the start address value of 0 byte to generate an address to access the element a1 (e.g., 1 byte). Similarly, the first address offset value of 1 byte may be added to the address for the element a1 to generate an address to access the element a2 (e.g., 2 bytes), and so on.

In another embodiment, for each access for the x-dimension, the respective address may be generated by incrementing a first counter value from 0 to (the first count indicator value−1=6), multiplying the first address offset with the respective first counter value to generate a respective first multiplication result, and adding the start address to the respective first multiplication result. Thus, the first address offset value of 1 byte for the x-dimension may allow the memory controller 102 to access consecutive 7 elements in each row.

In another example, a first address offset value of 2 bytes for the x-dimension may allow the memory controller 102 to read every other element from the 7 elements in each row by skipping one element when accessing the matrix 202. For example, as shown in FIG. 2A, the first address offset value of 2 bytes may correspond to an address increment of 2 bytes between accessing the elements a0 and a2, a2 and a4, and a4 and a6 for the first row.

A second address offset value of 8 bytes may correspond to an address increment of 8 bytes between accessing each of the elements to be accessed for the y-dimension. Thus, the second address offset value of 8 bytes for the y-dimension may allow the memory controller 102 to jump to a next row in the 7 rows when accessing the matrix 202. For example, as shown in FIG. 2A, the second address offset value of 8 bytes may correspond to an address increment of 8 bytes between accessing elements a0 and a7, a7 and a14, a14 and a21, a21 and a28, a28 and a35, and a35 and a42 for a first column. In other words, the element a0 is accessed using the start address 106. There is an address increment of 8 bytes for accessing the element a7. Thus, the second address offset value of 8 bytes may be added to the start address value of 0 byte to generate an address to access the element a7 (e.g., 8 bytes). Similarly, the second address offset value of 8 bytes may be added to the address for the element a7 to generate an address to access the element a14 (e.g., 16 bytes), and so on.

For each of the remaining 6 rows, the memory controller 102 may add the second address offset iteratively to the start address to determine a respective address of a first element of each of the remaining 6 rows, e.g., a7, a14, a21, a28, a35 and a42. The memory controller 102 may further determine, for each of the remaining 6 rows, a respective address for each of the remaining elements to be accessed in the x-dimension. In some embodiments, the respective address for each of the remaining elements to be accessed in the x-dimension, for each of the remaining 6 rows, can be determined by adding the first offset value iteratively to the respective address of the first element of each of the remaining 6 rows for accessing each remaining element to be accessed in the x-dimension for the respective row.

In another embodiment, the respective address to access a first element in each row may be generated by incrementing a second counter value from 0 to (second count indicator value−1=6), multiplying the second address offset with a respective second counter value to generate a respective second multiplication result, and adding the start address to the respective second multiplication result. The respective address to access remaining elements in each row for the x-dimension may be determined using the methods described above.

Thus, the second address offset value of 8 bytes for the y-dimension can allow the memory controller 102 to read the elements to be accessed from the 7 consecutive rows. In another example, a second address offset value of 16 bytes for the y-dimension may allow the memory controller 102 to read every other row from the 7 rows by skipping one row when accessing the matrix 202. For example, as shown in FIG. 2A, the second address offset value of 16 bytes may correspond to an address increment of 16 bytes between accessing the elements a0 and a14, a14 and a28, and a28 and a42 for the first column.

In some implementations, the respective address may be generated by adding the respective first multiplication result to the respective second multiplication result for each element to be accessed for each row of the matrix 202. Note that other methods to determine the respective address for accessing each element to be accessed based on the start address, the first address offset, and the second address offset are possible without deviating from the scope of the disclosed technologies. Some embodiments can be used to access data stored across three dimensions of an array as discussed with reference to FIG. 2B.

FIG. 2B illustrates a set of matrices stored in the memory, which can be accessed using the memory controller in certain embodiments of the disclosed technologies.

As shown in FIG. 2B, the set of matrices may comprise sixteen matrices, e.g., matrix 0, matrix 1, . . . , matrix 15. The set of matrices may be stored in a memory region 204. The memory region 204 may be part of the memory 104 in FIG. 1. Each of the matrices 0-15 may be a 3×3 matrix. Each row of the matrix may be aligned to 8 bytes. The set of matrices may be stored in the memory region 204 as a three-dimensional array (e.g., N=3). Each matrix may include 9 elements arranged into 3 rows (e.g., x-dimension) and 3 columns (e.g., y-dimension). Each element may be one byte in size. Since each row of the matrix is aligned to 8 bytes, remaining elements in the x-dimension are shown as x (don't care). A third dimension (e.g., z-dimension) may be used to represent the set of matrices. For example, each matrix in the set of matrices 0-15 may be aligned to 128 bytes.

The memory controller 102 may receive information to access the set of matrices 0-15 stored in the memory region 204. As shown below in Table 2, the information may include the start address 106, the address offsets 126, the count indicators 112, the dimensions indicator 114, and the controls 116. In some embodiments, the memory controller 102 may receive the element size 108 and the step counts 110 and generate the respective address offsets 126 internally.

| | |
|---|---|
| Start address | 0 |
| dimensions indicator | 3 |
| first count indicator | 3 |
| first address offset | 1 byte |
| second count indicator | 8 |
| second address offset | 8 bytes |
| third count indicator | 16 |
| third address offset | 128 bytes |

As an example, the start address 106 may be 100 corresponding to a first element a0 of the matrix 0. The dimensions indicator 114 may indicate a value of 3 for N. The count indicators 112 may include a first count indicator for the x-dimension, a second count indicator for the y-dimension, and a third count indicator for the z-dimension. For example, the first count indicator may be equal to 3 indicating 3 elements corresponding to 3 columns in the x-dimension, and the second count indicator may be equal to 3 corresponding to 3 rows in the y-dimension, and the third count indicator may be equal to 16 corresponding to 16 matrices in the z-dimension. The step size 108 may indicate that the size of each element is 1 byte. The first step count may be 1 corresponding to 0 elements to be skipped for the x-dimension, the second step count may be 8 corresponding to 7 elements to be skipped for the y-dimension, and the third step count may be 128 corresponding to 127 elements to be skipped for the z-dimension.

The memory controller 102 may access address offsets 126 indicating a value of 1 byte for a first address offset for the x-dimension, a value of 8 bytes for a second address offset for the y-dimension, and a value of 128 bytes for a third address offset for the z-dimension. A first address offset value of 1 byte may correspond to an address increment of 1 byte between accessing each of the elements to be accessed for the x-dimension, i.e., no elements to be skipped in the x-dimension. A second address offset value of 8 bytes may correspond to an address increment of 8 bytes between accessing each of the elements to be accessed for the y-dimension i.e., the next row starts after eight elements in the x-dimension. A value of 128 for the z address offset may correspond to an address increment of 128 bytes between accessing each of the elements to be accessed for the y-dimension, i.e., the next matrix starts after 128 bytes in the y-dimension.

According to certain embodiments, for each row in the second count indicator, the memory controller 102 may determine a respective address for each of the elements in the first count indicator based on the start address 106, the first address offset, and the second address offset. For example, the respective address for a first element (e.g., a0) in the first count indicator (e.g., 3 elements in each row) and the second count indicator (e.g., 3 rows) is the start address 106. In one embodiment, the memory controller 102 may use a first counter for the x-dimension, a second counter for the y-dimension, and a third counter for the z-dimension to calculate a respective address for each element as discussed previously with reference to FIG. 2A. In another embodiment, the memory controller 102 may determine the respective address for each remaining element for the first row (e.g., a1 and a2) by iteratively adding the first address offset to the start address 106. The memory controller 102 may also determine, for each remaining row in the second count indicator, the respective address to access each element in the first count indicator. For each matrix in the third count indicator, the memory controller 102 may further determine, for each row in the second count indicator, the respective address to access each element in the first count indicator.

As discussed with reference to FIGS. 2A and 2B, use of the respective address offsets to jump locations in the memory for one or more dimensions can allow flexibility for fine-grained access at the element level. Certain embodiments of the disclosed technologies may be used to efficiently access data sets for neural network computations as discussed with reference to FIG. 3.

Figure 3:
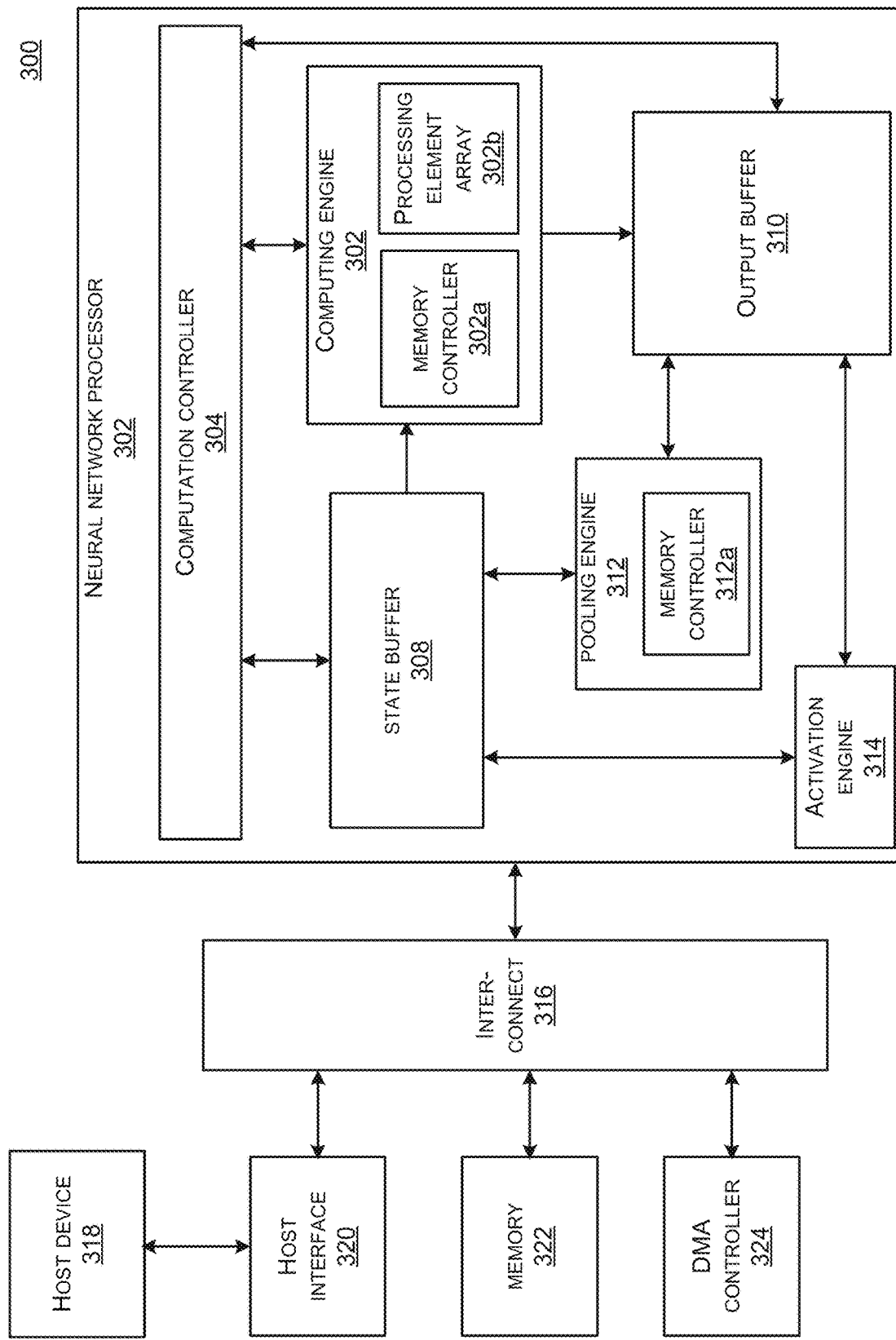
FIG. 3 shows an apparatus for neural network computations utilizing certain aspects of the disclosed technologies.

FIG. 3 shows an apparatus 300 for neural network computations utilizing certain aspects of the disclosed technologies. The apparatus 300 may include a neural network processor 302 coupled to a host interface 320, memory 322, and a direct memory access (DMA) controller 324 via an interconnect 316. The interconnect 316 may be an AXI interface or any suitable interface. In some implementations, the apparatus 300 may be part of a computer system. For example, the computer system may be configured to provide multi-tenant compute services for data processing applications such as an image recognition service, text-based data processing (e.g., processing of search queries), audio or video data processing, etc. The apparatus 300 may provide computing and memory resources for the convolution computations. Some embodiments may be described with reference to neural networks, however it will be understood that certain embodiments may be used in other applications, e.g., pattern recognition, image processing, computer vision, etc., without deviating from the scope of the technologies.

The host interface 320 may be configured to enable communication between a host device 318 and the neural network processor 302. For example, the host interface 320 may be used to transfer data and instructions related to the neural network computations. The host interface 320 may include, e.g., a peripheral component interconnect express (PCIe) interface, or any suitable interface for communicating with the host device 318.

The host device 318 may be configured to generate instructions to be executed by the neural network processor 302. In some implementations, the instructions may be in the form of compiled code, which can be executed by the neural network processor 302. For example, the host device 318 may generate computer code which can be compiled offline and stored in the memory 322. Note that the host device 318 may include components, e.g., processor, memory, etc., which are not shown here for the purposes of simplicity.

The memory 322 may be configured to store the instructions and data provided by the host device 318. For example, the memory 322 may be configured to store input data sets (e.g., input feature maps), and weights (e.g., filters) received from the host device 318. Each input data set may comprise elements, which may be stored in the memory 322 as a matrix. The memory 322 may also be configured to store outputs of the neural network processor 302 (e.g., output data sets) that may be used by the host device 318 for inferences or predictions about a pattern or an object from the given input data set. The memory 322 may include any suitable memory, e.g., dynamic random access memory (DRAM), synchronous DRAM (SDRAM), double data rate DRAM (DDR DRAM), storage class memory (SCM), flash memory, etc.

The DMA controller 324 may be configured to perform DMA operations to transfer data between the neural network processor 302 and the host device 318. For example, as discussed above, the host device 318 can provide the instructions, input data sets, and the weights to be stored in the memory 322. The host device 318 can provide the memory addresses for the stored instructions, data, and the weights to the neural network processor 302 (e.g., in the form of memory descriptors). The neural network processor 302 can then obtain the stored instructions, data, and the weights based on the memory addresses provided by the host device 318. The neural network processor 302 can also store the results of computations (e.g., one or more image recognition decisions) in the memory 322, and provide the memory addresses for the stored results to the host device 318.

The neural network processor 302 may include a computation controller 304, a computing engine 306, a state buffer 308, an output buffer 310, a pooling engine 312, and an activation engine 314. The neural network processor 302 may be configured to provide the computing resources to support the computations for different convolution layers. For example, as discussed above, the instructions, input data sets, and the weights may be stored in the memory 322. The host device 318 can provide the memory addresses for the stored instructions, input data sets, and the weights to the neural network processor 302. The neural network processor 302 can then obtain the stored instructions, input data sets, and the weights based on the memory addresses provided by the host device 318. The neural network processor 302 can also store the results of computations (e.g., one or more image recognition decisions) in the memory 322, and provide the memory addresses for the stored results to the host device 318. The start address 126 may correspond to an address of the state buffer 308, the memory 322, or the output buffer 310. The neural network processor 302 may be implemented as a system on chip (SoC), a field programmable gate array (FPGA), or any suitable circuit.

The state buffer 308 may be configured to provide caching of data used for computations at the computing engine 306. The data cached at the state buffer 308 may include the input data sets and the weights acquired from the memory 322, as well as intermediate outputs of computations at the computing engine 306. The caching can reduce the effect of memory access bottleneck (e.g., caused by the latencies at the memory 322, the DMA controller 324, the interconnect 316, etc.) on the performance of the computing engine 306. The state buffer 308 can be an on-chip memory device and may include a static random access memory (SRAM) or any suitable memory. The input data sets or the intermediate outputs may be stored in the state buffer 308 as the sets of matrices. In certain embodiments, the input data set stored in the state buffer 308 may be read using the memory controller 102 for data processing by various components of the neural network processor 302.

The computation controller 304 may be configured to provide controls to various components of the neural network processor 302 to perform arithmetic computations. In some implementations, the computation controller 304 may read the instructions stored in the memory 322 and store them in an instruction buffer. The computation controller 304 may decode the instructions and schedule the executions of the instructions by various components of the neural network processor 302. For example, the instructions may include shifting the weights or input data sets from the state buffer 308 into the computing engine 306 to perform matrix multiplications. The instructions may also include shifting the intermediate outputs from the output buffer 310 into the pooling engine 312 to perform pooling operations. In some embodiments, the instructions may include parameters to be used by a memory controller to perform fine-grained accesses to the state buffer 308, or the output buffer 310. For example, the parameters may include one or more count indicators, one or more address offsets, a dimension indicator, size of each element, and any other relevant information. The computation controller 304 may be further configured to decode the instructions, and extract various parameters which can be provided to different components performing the fine-grained access.

The computing engine 306 may be configured to perform computations for the neural network. The computing engine 302 may include a memory controller 302a and a processing element array 302b. The memory controller 302a may be similar to the memory controller 102 in FIG. 1. In some embodiments, the processing element (PE) array 302b may include a systolic array comprising a set of PEs, configured to perform one or more arithmetic operations involved in the neural network computations. Each PE may perform matrix multiplication and matrix convolution using input data sets and associated weights. For example, the input data set elements corresponding to the input data set and the weight values may be read from the state buffer 308. The weights and the input data sets may be read from the state buffer 308 into the computation engine 306 using the memory controller 302a. In some embodiments, the computing engine 306 may store the computation results in the output buffer 310 using the memory controller 302a.

In certain embodiments, the memory controller 302a may access the state buffer 308 using the memory address 120 generated by the memory controller 302a based on a start address, one or more count indicators, and one or more address offsets. The one or more count indicators and the address offsets may correspond to one or more dimensions of the input data sets stored in the state buffer 308. In one implementation, the count indicators, the element size, and the step counts may be provided by the computation controller 304 along with a start address and any other relevant information to perform the fine-grained memory access. The memory controller 302a may generate the address offsets using the element size and the step counts. In another implementation, the address offsets may be provided by the computation controller 304.

In some implementations, the computing engine 306 may decode the instructions scheduled by the computation controller 304 to read the input data sets and the weights from the state buffer 308. The computation controller 304 may decode the instructions to extract the information for the fine-grained memory access which may be used by the memory controller 312a to read the input data sets from the state buffer 308. In some instances, the input data set elements may correspond to a tile or a patch of the input data set to be convolved with a weight value. The computing engine 306 may provide the computation results to be stored in the output buffer 310. Some embodiments may be used to reshape a matrix or a tile of a matrix on the fly. For example, using appropriate values for the address offsets and count indicators may allow re-shaping the matrix from a row-major manner into a column-major manner, or vice versa. This may be beneficial in certain instances where transposing a matrix or a tile of matrix may be needed.

The output buffer 310 may include a set of registers to store the output data sets generated by the computing engine 306. The output buffer 310 may also enable additional processing such as a pooling operation to reduce the size of the stored outputs. For example, the outputs generated by the computing engine 306 can be shifted into the pooling engine 312 to perform the pooling operation. In some implementations, the computation engine 306 can be operated to perform computations for a particular convolution layer, and the output buffer 310 can process the outputs of that convolution layer and store the processed output data sets (with or without processing by the activation engine 314) at the state buffer 308.

The pooling engine 312 may be configured to perform pooling operations on the data sets. The pooling operation may include down sampling using a non-linear function. The pooling operation may include mean or maximum pooling to reduce the spatial dimensions. The pooling engine 312 may include a memory controller 312a, and components to perform the pooling operation which are not shown here for the purposes of simplicity. The memory controller 312a may be similar to the memory controller 102 in FIG. 1. In one implementation, the count indicators and the address offsets used by the memory controller 312a may be provided by the computation controller 304 along with a start address and any other relevant information to perform the fine-grained memory access. In another implementation, the pooling engine 312 may decode the instructions scheduled by the computation controller 304 to read the data sets from the output buffer 310. The pooling engine 312 may decode the instructions to extract the information for the fine-grained memory access which may be used by the memory controller 312a to read the data sets from the output buffer 310. The address offsets may be generated by the computation controller 304 or by the memory controller 312a using the element size and the step counts. The pooling engine 312 may operate on the data sets read using the memory controller 312a and identify an element with a maximum value from the set of elements. Thus, reading the data elements efficiently using the memory controller 312a in accordance with some aspects of the disclosure can help accelerate the pooling operations, thus increasing the system throughput. In some embodiments, the memory controller 312a may be used to write the output data sets generated as a result of the pooling operations to the state buffer 308 using certain aspects of the disclosed technologies.

The activation engine 314 may be configured to apply one or more activation functions (e.g., ReLu function) on the output of the output buffer 310. For example, the activation engine 314 may include one or more lookup tables (e.g., in the form of multiplexer circuits) that can map the input to one of the candidate outputs representing the result of applying the activation function to the input. In some examples, the activation engine 314 may also include a bypass path to allow outputs from the output buffer 310 to be stored directly at the state buffer 308 when activation functions are not to be applied.

Figure 4B:
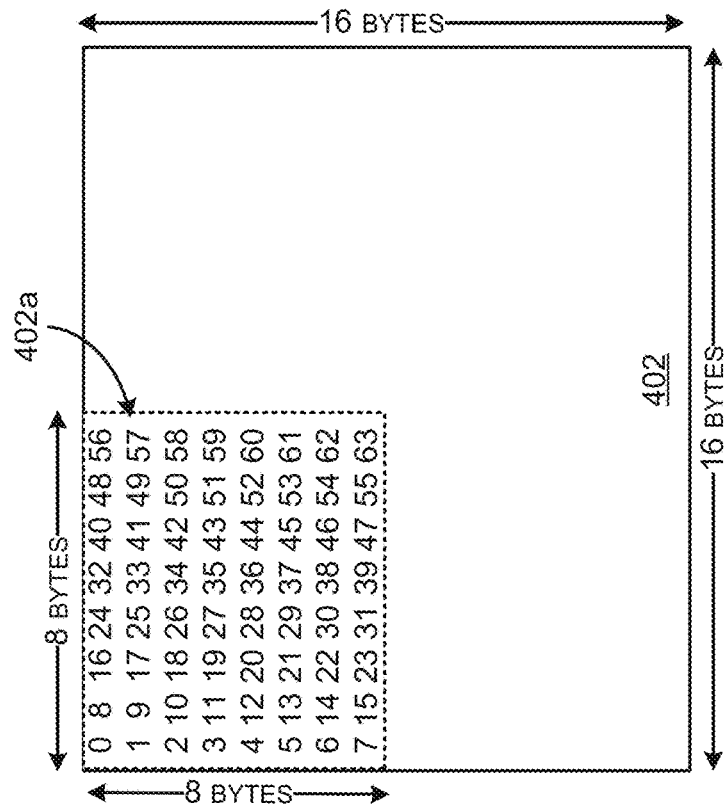
FIG. 4B illustrates a transposed tile using the memory controller using certain aspects of the disclosed technologies.
Figure 4A:
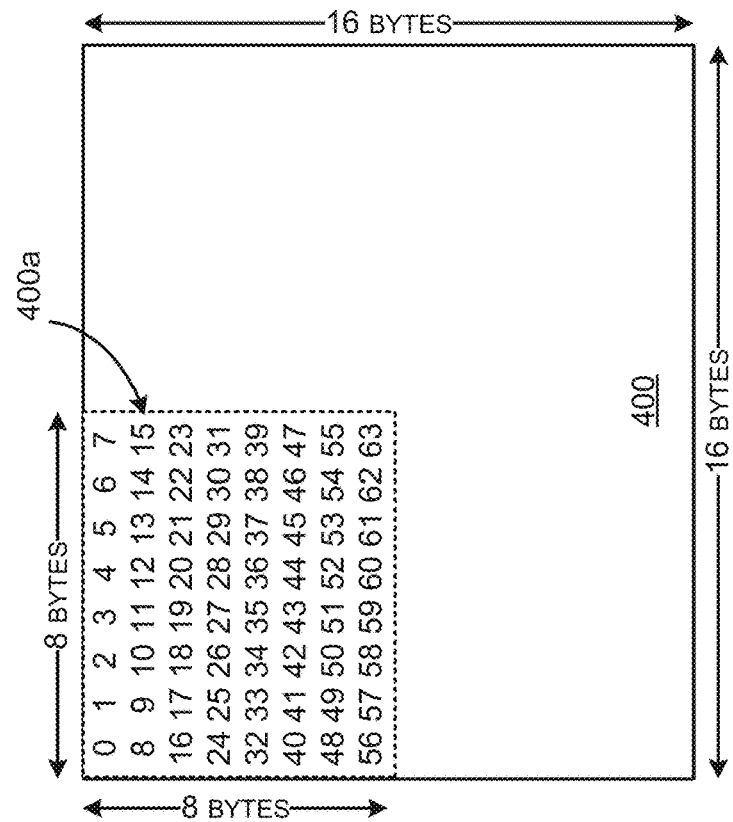
FIG. 4A illustrates a tile of a matrix which can be read in a row-major or a column-major manner using the memory controller using certain aspects of the disclosed technologies.

FIG. 4A illustrates a tile of a matrix which can be read in a row-major or a column-major manner using the memory controller using certain aspects of the disclosed technologies.

As shown in FIG. 4A, a 16×16 matrix 400 may include an 8×8 tile 400a. Referring back to FIG. 3, the matrix 400 may correspond to a data set stored in the state buffer 308. According to certain embodiments, the memory controller 302a may be used to read the tile 400a from the state buffer 308 in a row-major manner or in a column-major manner. For example, in the row-major manner, consecutive elements of each row in the tile 400a may be read using a first set of parameters. In the column-major manner, consecutive elements of each column in the tile 400a may be read using a second set of parameters.

Table 3 below shows the first set of parameters to read the tile 400a in the row-major manner.

| Start address | 100 |
| dimensions indicator | 2 |
| first count indicator | 8 |
| first address offset | 1 byte |
| second count indicator | 8 |
| second address offset | 16 bytes |

The memory controller 302a may use the first set of parameters to read the tile 400a from the state buffer 308 in a row-major manner. For example, using the first set of parameters, the memory controller 302a may read the elements of the first row, the second row, and so on.

Table 4 below shows the second set of parameters to read the tile 400a in the column-major manner.

| Start address | 100 |
| dimensions indicator | 2 |
| first count indicator | 8 |
| first address offset | 16 bytes |
| second count indicator | 8 |
| second address offset | 1 byte |

The memory controller 302a may use the second set of parameters to read the tile 400a from the state buffer 308 in a column-major manner. For example, using the second set of parameters, the memory controller 302a may read the elements of the first column, the second column, and so on. Thus, certain embodiments may be used to reshape the matrix as discussed with reference to FIG. 4B.

FIG. 4B illustrates a tile 402a transposed from the tile 400a using the memory controller using certain aspects of the disclosed technologies.

Certain embodiments can allow reshaping of a matrix on the fly. For example, as discussed above, reading of the tile 400a in the column-major manner using the second set of parameters can transpose the tile 400a to the tile 402a. In some instances, the tile 400a may be read from a source memory in the column-major manner and can be stored in a destination memory as the tile 402a. For example, the tile 400a may be part of an intermediate output data set generated by the computing engine 302. The tile 400a may be read from the output buffer 308 by the memory controller and the transposed tile 402a may be stored in the state buffer 308 for further processing by the computing engine 302.

Figure 5A:
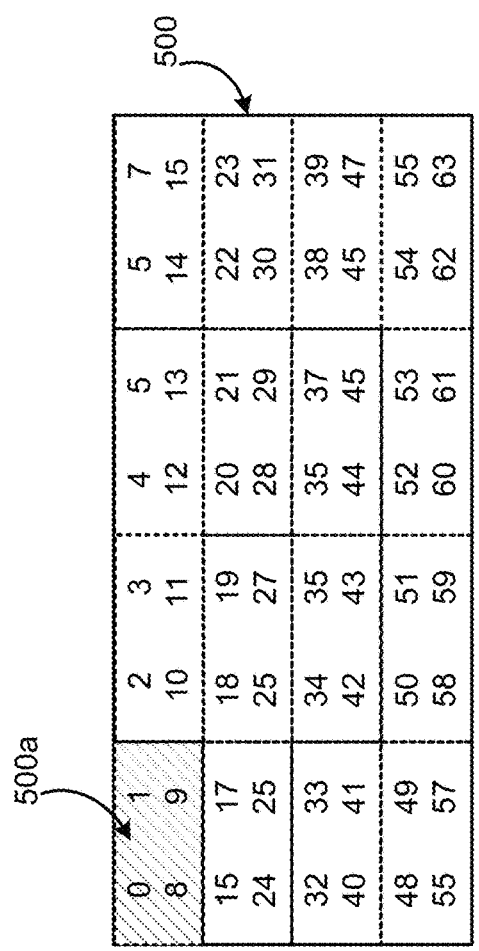
FIG. 5A illustrates a first use case for the memory controller in pooling operations, using certain aspects of the disclosed technologies.

FIG. 5A illustrates a first use case for the memory controller in pooling operations, using certain aspects of the disclosed technologies.

FIG. 5A shows an 8×8 matrix 500. Referring back to FIG. 3, the matrix 500 may be stored in the output buffer 310 as an intermediate output of computations performed by the computing engine 302. In some embodiments, the matrix 500 may be read by the memory controller 312a of the pooling engine 312 to perform the pooling operations on the matrix 500.

The pooling operation may include identifying an element with a maximum value in each 2×2 tile of the sixteen tiles of the matrix 500. The memory controller 312a may be used to read each 2×2 tile of the matrix 500 from the output buffer 310 which can be used for the pooling operation. FIG. 5A shows a shaded 2×2 tile 500a for the simplicity of illustration. However, the matrix 500 includes four sets of tiles shown as 16 rectangles. Each set of tiles may include 4 tiles. Each tile may comprise 4 elements. The memory controller 312a may use an appropriate start address and parameters to read each tile from the output buffer 310.

Table 5 shows the parameters used by the memory controller 312b to read each of the 16 tiles of the matrix 500, which can be used by the pooling engine 312 to perform the pooling operation.

| | |
|---|---|
| Start address | 0 |
| dimensions indicator | 4 |
| first count indicator | 2 |
| first address offset | 1 |
| second count indicator | 2 |
| second address offset | 8 |
| third count indicator | 4 |
| third address offset | 2 |
| fourth count indicator | 4 |
| fourth address offset | 16 |

The parameters may include a first count indicator indicating 2 elements for the x-dimension for each of the 16 tiles, a second count indicator indicating 2 rows for the y-dimension for each of the 16 tiles, a third count indicator indicating 4 tiles for the z-dimension for each of the 4 sets of tiles, and a fourth count indicator indicating 4 sets of tiles for the w-dimension. The parameters may further include a first address offset indicating 1 byte of address increment for the x-dimension for each tile, a second address offset indicating 8 bytes of address increment for the y-dimension for each row, a third address offset indicating 2 bytes of address increment for the z-dimension between accessing each tile, and a fourth address offset indicating 16 bytes of address increment for the w-dimension between accessing each set of tiles. For example, the memory controller 312b may determine, for each set of tiles in the 4 set of tiles indicated by the fourth count indicator, the respective address for each of the elements to be accessed in the 2 elements indicated by the first count indicator for each row in the 2 rows indicated by the second count indicator for each tile in the 4 tiles indicated by the third count indicator, based on the start address, the first address offset, the second address offset, the third address offset, and the fourth address offset. The memory controller 312b can calculate a respective address for each element to be accessed based on the parameters shown in Table 5, using any of the methods described previously with reference to FIGS. 2A and 2B.

Figure 5B:
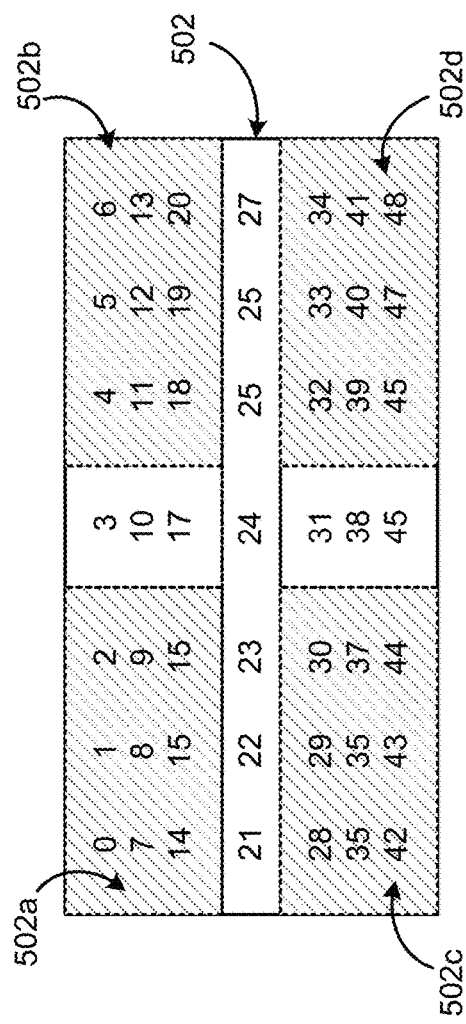
FIG. 5B illustrates a second use case for the memory controller in pooling operations, using certain aspects of the disclosed technologies.

FIG. 5B illustrates a second use case for the memory controller in pooling operations, using certain aspects of the disclosed technologies.

FIG. 5B shows a 7×7 matrix 502. Referring back to FIG. 3, the matrix 502 may be stored in the output buffer 310 as an intermediate output of computations performed by the computing engine 302. In some embodiments, the matrix 502 may be read by the memory controller 312a of the pooling engine 312 to perform the pooling operations on each of the shaded tiles of the matrix 502.

The pooling operation may include identifying an element with a maximum value in each of the four 3×3 tiles of the matrix 502. The memory controller 312a may be used to read each 3×3 tile of the matrix 502 from the output buffer 310 which can be used for the pooling operation. FIG. 5B shows a tile 502a, a tile 502b, a tile 502c, and a tile 502d. Each of the tiles 502a-502d of the matrix 502 may comprise 9 elements. The memory controller 312a may use an appropriate start address and the parameters to read each of the tiles 502a-502d from the output buffer 310. The tiles 502a and 502b may correspond to a first set of tiles, and the tiles 502c and 502d may correspond to a second set of tiles.

Table 6 shows the parameters used by the memory controller 312b to read each of the shaded tiles of the matrix 502.

| | |
|---|---|
| Start address | 0 |
| dimensions indicator | 4 |
| first count indicator | 3 |
| first address offset | 1 |
| second count indicator | 3 |
| second address offset | 7 |
| third count indicator | 2 |
| third address offset | 4 |
| fourth count indicator | 2 |
| fourth address offset | 14 |

The parameters may include a first count indicator indicating 3 elements for the x-dimension for each of the tiles 502a-502d, a second count indicator indicating 3 rows for the y-dimension for each of the tiles 502a-502d, a third count indicator indicating 2 tiles for the z-dimension for each set of tiles, and a fourth count indicator indicating 2 sets of tiles for the w-dimension. The parameters may further include a first address offset indicating 1 byte of address increment for the x-dimension for each tile, a second address offset indicating 7 bytes of address increment for the y-dimension for each row, a third address offset indicating 4 bytes of address increment for the z-dimension between accessing each tile, and a fourth address offset indicating 14 bytes of address increment for the w-dimension between accessing each set of tiles. For example, the memory controller 312b may determine, for each set of tiles in the 2 set of tiles indicated by the fourth count indicator, the respective address for each of the elements to be accessed in the 3 elements indicated by the first count indicator for each row in the 3 rows indicated by the second count indicator for each tile in the 2 tiles indicated by the third count indicator, based on the start address, the first address offset, the second address offset, the third address offset, and the fourth address offset. The memory controller 312b can calculate a respective address for each element to be accessed based on the parameters shown in Table 6, using any of the methods described previously with reference to FIGS. 2A and 2B.

Figure 6:
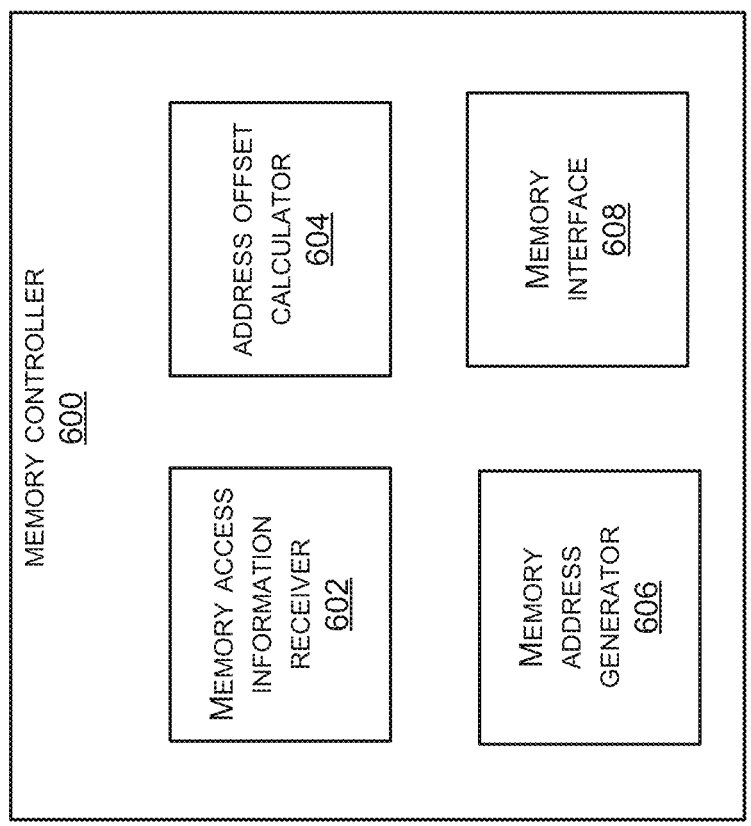
FIG. 6 illustrates components of a memory controller in one embodiment of the disclosed technologies.

FIG. 6 illustrates components of a memory controller 600 in one embodiment of the disclosed technologies. The memory controller 600 may be similar to the memory controller 102 in FIG. 1, the memory controller 302a or the memory controller 312a in FIG. 3. The memory controller 600 may include a memory access information receiver 602, an optional address offset calculator 604, a memory address generator 606, and a memory interface 608. It will be understood that the memory controller 600 may include other or different components which are not shown here for the purposes of simplicity. For example, the memory controller 600 may include an interface to receive or send the data 118, which may be part of a data bus.

The memory access information receiver 602 may be configured to receive information to perform fine-grained access to the memory. For example, in one embodiment, the information may include the start address 106, one or more count indicators 112, the element size 108, one or more step counts 110, the dimensions indicator 114, the controls 116, and any other suitable information to perform fine-grained memory access. In another embodiment, the information may include the start address 106, one or more count indicators 112, one or more address offsets 126, the dimensions indicator 114, the controls 116, and any other suitable information to perform fine-grained memory access. In some embodiments, some or all the information may be provided as part of an instruction, which can be decoded using an instruction decoder. For example, as discussed with reference to FIG. 3, the information may be provided by the host device as part of the instructions stored in the memory 322. The instructions may be read via the interconnect 316 by the neural network processor 302. In one implementation, the instructions may be decoded by the computation controller 304 and the extracted parameters may be provided to the computing engine 302 or the pooling engine 312 to perform accesses using those parameters. In another implementation, the instructions may be decoded by different components of the neural network processor 302 and the extracted parameters may be used by those components. It will be understood that the memory controller 600 can be used by other components of the neural network processor 302 which are not shown in FIG. 3 for the purposes of simplicity.

The optional address offset calculator 604 may be configured to calculate the address offsets using the element size 108 and the step counts 110. The optional address offset calculator 604 may be configured to calculate the respective address offset for each dimension by multiplying the element size 108 with the respective step count 110 for the given dimension. For example, the optional address offset calculator 604 may utilize adders, multipliers, registers, or other suitable circuits to perform the multiplication. The address offsets generated by the optional address offset calculator 604 may be stored in registers (not shown) in the memory controller 600 and can be accessed by the memory controller 600 to generate respective addresses for the elements to be accessed. In some embodiments, the memory controller 600 may receive the address offsets 126 generated externally, and therefore the optional address offset calculator 604 may not be present.

The memory address generator 604 may be configured to calculate a memory address for each access to the memory based on the start address 106 and various parameters received by the memory access information receiver 602. For example, the memory address may be similar to the memory address 120. In some embodiments, the memory address generator 604 may utilize various counters, adders, multipliers, registers, and other suitable circuits to determine a respective memory address for each element to be accessed in the memory coupled to the memory controller 600. For example, in one implementation, the memory address generator 604 may determine the respective address for each element to be accessed by iteratively adding one or more address offsets to the start address 106. In another implementation, the memory address generator 604 may determine the respective address for each element to be accessed using different counters to count up to the number of elements, number of rows, number of matrices, number of sets of matrices, etc. based on various count indicator values. For example, the memory controller 102 may include a first counter to count each element to be accessed for a row, a second counter to count each row to be accessed for the matrix, a third counter to count each matrix to be accessed, and a fourth counter to count each set of matrices to be accessed. Each of the first counter, second counter, third counter, and the fourth counter may be initialized to a zero value. Other implementations are also possible within the scope of the disclosed technologies.

The memory interface 608 may be configured to interface with the memory to perform write and read accesses to the memory. Referring back to FIG. 1, the memory interface 608 may be configured to generate the memory address 120, and the memory controls 122 to write the memory data 124 to the memory 104 or read the memory data 124 from the memory 104. The memory address 120 may be generated by the memory address generator 606. The memory interface 608 may include pins, ports, or another appropriate interface to connect with a physical memory device.

Figure 7:
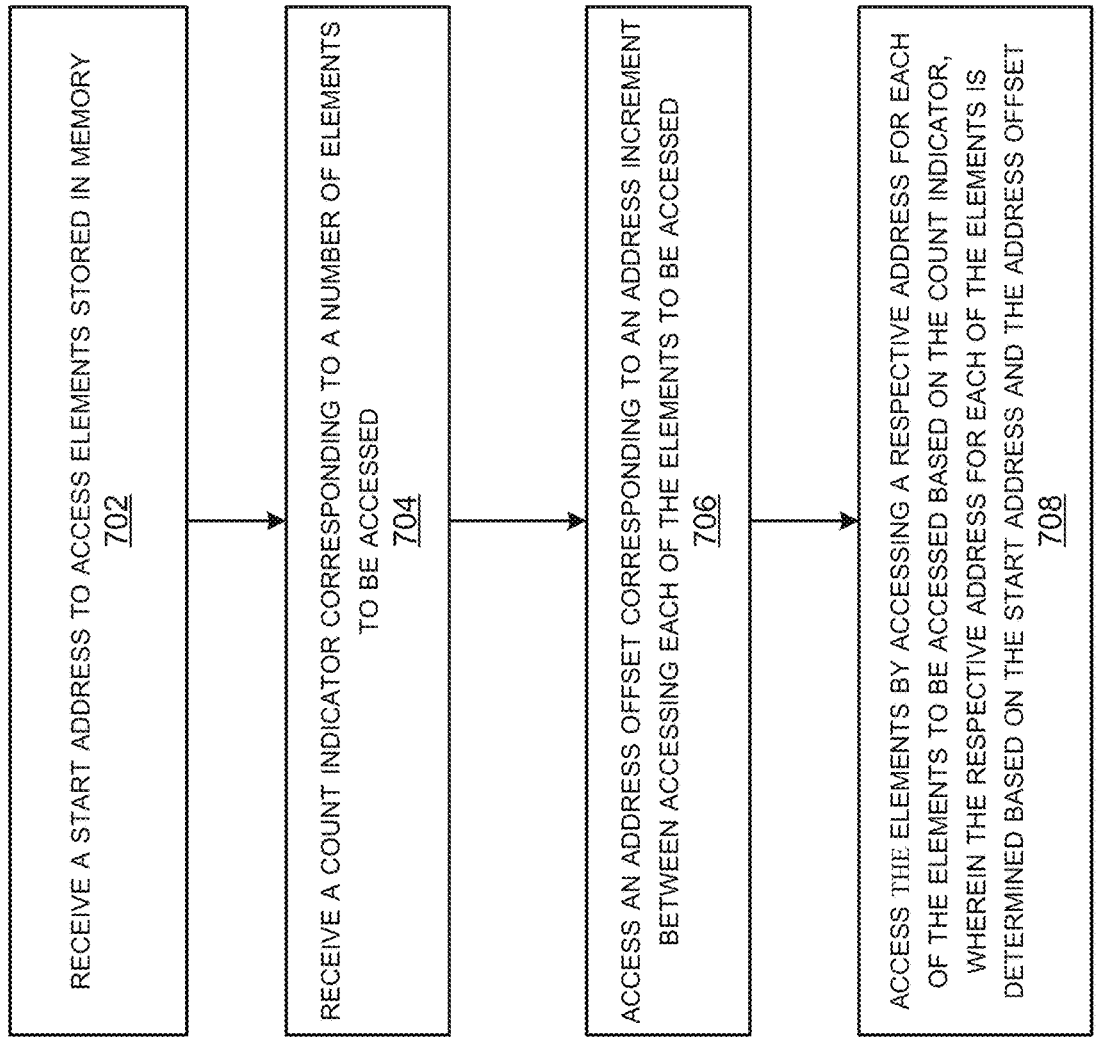
FIG. 7 illustrates a method executed by a memory controller in one embodiment of the disclosed technologies.

FIG. 7 illustrates a method executed by a memory controller in one embodiment of the disclosed technologies. The memory controller may be the memory controller 102 in FIG. 1.

In step 702, the memory controller 102 may receive a start address to access elements stored in the memory 104. In some embodiments, the elements may need to be accessed for data processing, e.g., matrix multiplication, pooling operations, transposing, etc., by the neural network processor 302. As discussed with reference to FIG. 3, the memory 104 may include the state buffer 308 or the output buffer 310. The memory controller 102 may receive the start address 106 to access the elements stored in the memory 104. The elements stored in the memory may correspond to one or more matrices, e.g., the matrix 202, the matrices 0-15, the matrix 400, the matrix 500, or the matrix 502. The start address 106 may be received by the memory access information receiver 602.

In step 704, the memory controller 102 may receive a count indicator corresponding to a number of elements to be accessed. The memory controller 102 may receive the count indicators 112 to access the elements stored across multiple dimensions of the matrix. For example, a first count indicator may correspond to a number of elements to be accessed for the x-dimension. A second count indicator may correspond to a number of rows to be accessed for the y-dimension. A third count indicator may correspond to a number of matrices to be accessed for the z-dimension. A fourth count indicator may correspond to a number of sets of matrices to be accessed for the w-dimension. The count indicators 112 may be received by the memory access information receiver 602.

In step 706, the memory controller 102 may access an address offset corresponding to an address increment between accessing each of the elements to be accessed. In one embodiment, the address offset may be generated by the memory controller 102 using the element size 108 and the step counts 110 as discussed with reference to FIG. 1A. For example, the address offset may be generated by the address offset calculator 604 in FIG. 6 and stored in a register in the memory controller 600. In another embodiment, the address offset may be the address offset 126 received by the memory controller 102 as discussed with reference to FIG. 1B. The memory controller 102 may access the address offsets 126 corresponding to a respective address increment between accessing each of the elements to be accessed for each dimension of the matrix.

In step 708, the memory controller 102 may access the elements by accessing a respective address for each of the elements to be accessed based on the count indicator. The respective address for each of the elements may be determined based on the start address and the address offset. The respective address for each of the elements may be the memory address 120 generated by the memory address generator 606 as discussed with reference to FIG. 6. For example, the memory address generator 606 may generate the respective address using the start address 106, and the address offsets generated by the address offset calculator 604 or received by the memory access information receiver 602. The memory controller 102 may access the elements using the memory interface 608.

Figure 8:
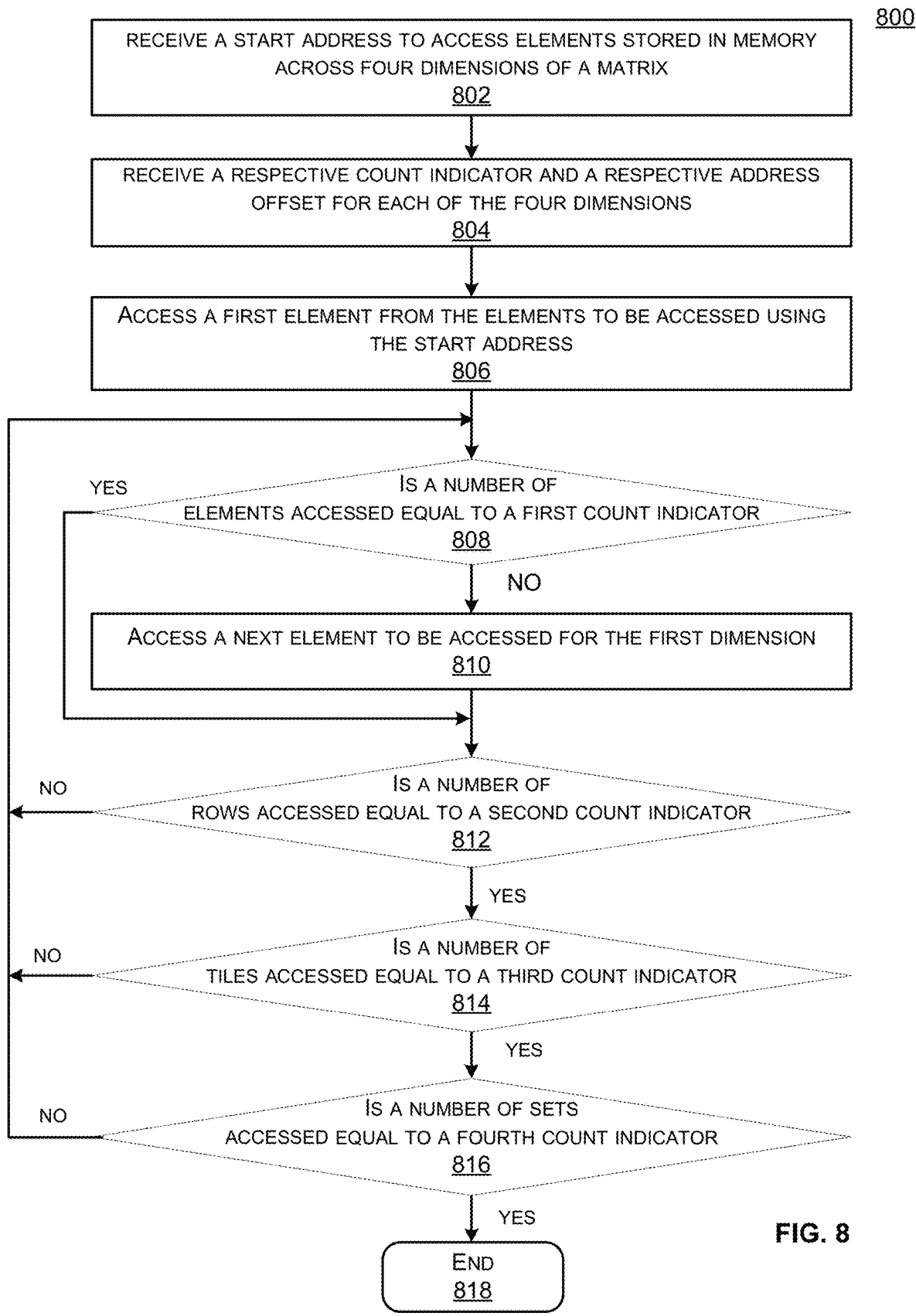
FIG. 8 illustrates a method executed by a memory controller to read elements stored across multiple dimensions of a matrix in one embodiment of the disclosed technologies.

FIG. 8 illustrates a method executed by a memory controller to read elements stored across multiple dimensions of a matrix in one embodiment of the disclosed technologies. The memory controller may be the memory controller 102 in FIG. 1.

In step 802, the memory controller may receive a start address to access elements stored in memory across four dimensions of a matrix. For example, the elements may be stored across the x-dimension, the y-dimension, the z-dimension, and the w-dimension in the memory region 502 as discussed with reference to FIG. 5B. The memory controller 102 may receive the start address 106 as 0.

In step 804, the memory controller may receive a respective count indicator and a respective address offset for each of the four dimensions. The memory controller 102 may receive the count indicators 310 and the address offset 326 for each of the four dimensions using the memory access information receiver 602. For example, as shown in Table 6, the memory controller 102 may receive a first count indicator indicating 3 elements for the x-dimension for each tile. The memory controller 102 may receive a second count indicator indicating 3 rows for the y-dimension for each tile. The memory controller 102 may receive a third count indicator indicating 2 tiles for the z-dimension for each set of tiles. The memory controller 102 may receive a fourth count indicator indicating 2 sets of tiles for the w-dimension. The memory controller 102 may also receive a first address offset indicating 1 byte of address increment for the x-dimension for each tile. The memory controller 102 may receive a second address offset indicating 7 bytes of address increment for the y-dimension for each row. The memory controller 102 may receive a third address offset indicating 4 bytes of address increment for the z-dimension between accessing each tile. The memory controller 102 may receive a fourth address offset indicating 14 bytes of address increment for the w-dimension between accessing each set of tiles.

In step 806, the memory controller may access a first element from the elements to be accessed using the start address. The memory controller 102 may access the first element 0 using the start address 0. For example, the memory address generator 606 may generate the memory address 120 using the start address 0. The memory controller 102 may provide the memory address 120 to the memory 104 using the memory interface 608 and read the first element 0 using the memory data bus 124.

In step 808, the memory controller may determine if a number of elements accessed is equal to a first count indicator. The memory controller 102 may increment a first counter value by 1 after accessing an element for a given row. If the first counter value is equal to the first count indicator value of 3, it may indicate that all three elements in a first row of the tile 502*a* have been accessed, and the memory controller 104 may jump to step 812 to determine if all the rows in the tile 502*a* have been accessed. If the first counter value is not equal to the first count indicator value of 3, it may indicate that remaining elements in the first row of the tile 502*a* have to be accessed.

In step 810, the memory controller may access a next element to be accessed for the first dimension. The memory controller 102 may read the next element of the first row of the tile 502*a*.

In step 812, the memory controller may determine if a number of rows accessed equal to a second count indicator. The memory controller 102 may increment a second counter value by 1 after accessing a row for a given tile. If the second counter value is equal to the second count indicator value of 3, it may indicate that all three rows of the tile 502*a* have been accessed, and the memory controller 104 may jump to step 814 to determine if all the tiles in the set of tiles have been accessed. If the second counter value is not equal to the second count indicator value of 3, it may indicate that the remaining rows in the tile 502*a* have to be accessed, and the memory controller 102 may jump to the step 808.

In step 814, the memory controller may determine if a number of tiles accessed are equal to a third count indicator. The memory controller 102 may increment a third counter value by 1 after accessing a tile for a given set of tiles. If the third counter value is equal to the third count indicator value of 2, it may indicate that both the tiles 502*a* and 502*b* have been accessed, and the memory controller 104 may jump to step 816 to determine if all of the sets of tiles have been accessed. If the third counter value is not equal to the third count indicator value of 2, it may indicate that tile 502*b* has to be accessed, and the memory controller 102 may jump to the step 808.

In step 816, the memory controller may determine if a number of sets accessed are equal to a fourth count indicator. The memory controller 102 may increment a fourth counter value by 1 after accessing each set of tiles. If the fourth counter value is equal to the fourth count indicator value of 2, it may indicate that both sets of tiles have been accessed, and all the elements in the matrix 502 have been accessed. If the fourth counter value is not equal to the fourth count indicator value of 2, it may indicate that the second set of tiles has to be accessed, and the memory controller 102 may jump to the step 808.

In step 818, the process ends once all of the elements have been accessed.

Certain embodiments of the disclosed technologies can utilize a memory controller to perform fine-grained accesses to the elements stored in the memory. The elements may be stored in the memory across one or more dimensions of an array. The memory controller can allow fine-grained accesses to non-contiguous memory locations by skipping zero or more elements across one or more dimensions of the array. Some embodiments can be used to perform accesses to a matrix of matrices to help accelerate various data processing applications.

Figure 9:
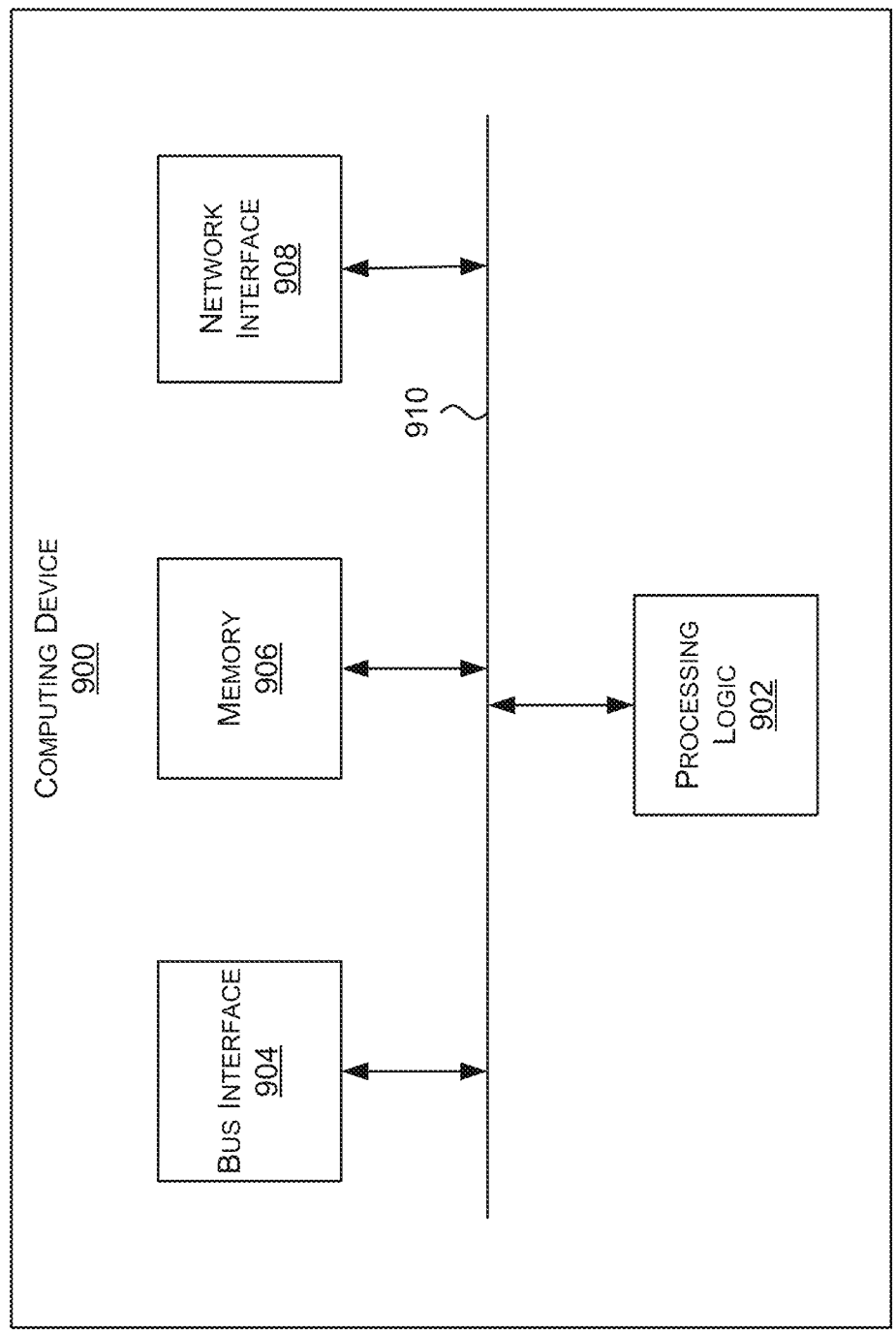
FIG. 9 illustrates an example of a computing device, according to certain aspects of the disclosure.

FIG. 9 illustrates an example of a computing device 900. Functionality and/or several components of the computing device 900 may be used without limitation with other embodiments disclosed elsewhere in this disclosure, without limitations. The computing device 900 may perform computations to facilitate processing of a task. As an illustrative example, the computing device 900 can be part of a server in a multi-tenant compute service system.

In one example, the computing device 900 may include processing logic 902, a bus interface 904, memory 906, and a network interface 908. These components may be hardware modules, software modules, or a combination of hardware and software. In certain instances, components may be interchangeably used with modules or engines, without deviating from the scope of the disclosure. The computing device 900 may include additional components, not illustrated here. In some implementations, the computing device 900 may include fewer components. In some implementations, one or more of the components may be combined into one module. One or more of the components may be in communication with each other over a communication channel 910. The communication channel 910 may include one or more busses, meshes, matrices, fabrics, a combination of these communication channels, or some other suitable communication channel.

The processing logic 902 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 906. The processing logic 902 may include components or functionalities similar to the computing engine 302 or the pooling engine 312 to perform data processing such as matrix multiplications, pooling operations, matrix transposing, etc. In some embodiments, the processing logic 902 may also include the memory controller 102 to perform fine-grained access to the elements stored in portions of the memory 906.

The memory 906 may include either volatile or non-volatile, or both volatile and non-volatile types of memory. The memory 906 may, for example, include random access memory (RAM), read only memory (ROM), Electrically Erasable Programmable Read-Only Memory (EEPROM), flash memory, and/or some other suitable storage media. In some cases, some or all of the memory 906 may be internal to the computing device 900, while in other cases some or all of the memory may be external to the computing device 900. The memory 906 may store an operating system comprising executable instructions that, when executed by the processing logic 902, provides the execution environment for executing instructions providing data processing functionality for the computing device 900. The memory 906 may also include the memory 104, the memory 322, the state buffer 308, or the output buffer 310. For example, the memory 906 may store one or more matrices as discussed in FIGS. 2A, 2B, 4A, 4B, 5A and 5B storing data elements across multiple dimensions.

The bus interface 904 may enable communication with external entities, such as a host device and/or other components in a computing system (e.g., the host device 318), over an external communication medium. The bus interface 904 may include a physical interface for connecting to a cable, socket, port, or other connection to the external communication medium. The bus interface 904 may further include hardware and/or software to manage incoming and outgoing transactions. The bus interface 904 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 904 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface 908 may include hardware and/or software for communicating with a network. This network interface 908 may, for example, include physical connectors or physical ports for wired connection to a network, and/or antennas for wireless communication to a network. The network interface 908 may further include hardware and/or software configured to implement a network protocol stack. The network interface 908 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc. In some embodiments, computing device 900 may receive a set of parameters, such as the aforementioned weight vectors for generation of forget gate factor, input factor, output factor, etc. from a server through network interface 908.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as pattern recognition, audio processing, video processing, search enquiries, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A pooling engine for a neural network processor, the pooling engine having a memory controller configured to:
   receive a set of parameters from a computation controller of the neural network processor, the computation controller being physically separate from the pooling engine, the set of parameters having been decoded by the computation controller from instructions to perform a pooling operation, wherein the set of parameters includes:
   a start address to access elements stored in memory;
   a first count indicator corresponding to a number of elements to be accessed in a first dimension;
   a second count indicator corresponding to a number of elements to be accessed in a second dimension;
   a first address offset corresponding to an address increment between each of the elements to be accessed in the first dimension; and
   a second address offset corresponding to an address increment between each of the elements to be accessed in the second dimension; and
   access the elements by accessing a respective address for each of the elements to be accessed based on the start address, the first count indicator, the second count indicator, the first address offset, and the second address offset such that one or more elements in the memory are skipped when accessing the elements in the memory, wherein the memory controller is configured to access the elements via a memory interface and bring the elements into the pooling engine for performing pooling operations on the elements.

2. The pooling engine of claim 1, wherein the memory controller is further configured to:
   receive an element size corresponding to a size of each element to be accessed.

3. The pooling engine of claim 1, wherein the first address offset is related to a size of each element to be accessed and a count of elements skipped between accessing each of the elements to be accessed.

4. The pooling engine of claim 1, wherein the respective address for a first element in the number of elements to be accessed in the first dimension is the start address, and wherein the respective address for at least one remaining element in the number of elements to be accessed in the first dimension is determined by iteratively adding the first address offset to the start address.

5. The pooling engine of claim 1, wherein the elements to be accessed correspond to a matrix having the first dimension and the second dimension, and wherein the first count indicator corresponds to a number of columns to be accessed in the matrix.

6. The pooling engine of claim 5, wherein the second count indicator corresponds to a number of rows to be accessed in the matrix.

7. The pooling engine of claim 6, wherein the respective address for a first element in the number of elements to be accessed in the first dimension for a first row is the start address, and wherein the respective address for each remaining element in the number of elements to be accessed for the first row is determined by iteratively adding the first address offset to the start address.

8. The pooling engine of claim 6 further configured to:
   increment a first counter value for each of the elements to be accessed in the first dimension based on the first count indicator,
   wherein the respective address is determined by summing the start address with a respective first multiplication result of a multiplication between the first address offset and a respective first counter value for each of the elements to be accessed in the first dimension.

9. The pooling engine of claim 8 further configured to:
   increment a second counter value for each of the rows to be accessed in the second dimension based on the second count indicator,
   wherein, for each of the rows of the second count indicator, the respective address for each of the elements to be accessed is determined by summing the respective first multiplication result with a respective second multiplication result of the multiplication between the second address offset and a respective second counter value.

10. The pooling engine of claim 1, wherein the elements stored in the memory correspond to a matrix and the number of elements to be accessed in the first dimension and the number of elements to be accessed in the second dimension corresponds to a tile of the matrix.

11. The pooling engine of claim 1, wherein at least a portion of the one or more elements are skipped in the first dimension.

12. The pooling engine of claim 1, wherein at least a portion of the one or more elements are skipped in the second dimension.

13. The pooling engine of claim 1, wherein the memory controller is a circuit.

14. A method comprising:
  receiving, by a memory controller of a pooling engine for a neural network processor, a set of parameters from a computation controller of the neural network processor, the computation controller being physically separate from the pooling engine, the set of parameters having been decoded by the computation controller from instructions to perform a pooling operation, wherein the set of parameters includes:
    a start address to access elements stored in memory;
    a first count indicator corresponding to a number of elements to be accessed in a first dimension;
    a second count indicator corresponding to a number of elements to be accessed in a second dimension;
    a first address offset corresponding to an address increment between each of the elements to be accessed in the first dimension; and
    a second address offset corresponding to an address increment between each of the elements to be accessed in the second dimension; and
  accessing, by the memory controller, the elements by accessing a respective address for each of the elements to be accessed based on the start address, the first count indicator, the second count indicator, the first address offset, and the second address offset such that one or more elements in the memory are skipped when accessing the elements in the memory, wherein the memory controller is configured to access the elements via a memory interface and bring the elements into the pooling engine for performing pooling operations on the elements.

15. The method of claim 14, further comprising:
  receiving an element size corresponding to a size of each element to be accessed.

16. The method of claim 14, wherein accessing the elements includes reading the elements from the memory using respective addresses.

* * * * *